(12) United States Patent  
Mori et al.

(10) Patent No.: US 7,056,029 B2
(45) Date of Patent: *Jun. 6, 2006

(54) BEARING DEVICE

(75) Inventors: Yasuhiro Mori, Miyota-Machi (JP);
Toshisada Koyama, Miyota-Machi (JP)

(73) Assignee: Minebea Co. Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/697,583

(22) Filed: Oct. 29, 2003

(65) Prior Publication Data

US 2004/0136630 A1     Jul. 15, 2004

(30) Foreign Application Priority Data

Oct. 29, 2002   (JP)   ............................. 2002-313639

(51) Int. Cl.
*F16C 19/08*     (2006.01)
(52) U.S. Cl. ...................................... 384/517
(58) Field of Classification Search ............... 384/517, 384/518, 563, 513, 584
See application file for complete search history.

(56) References Cited

U.S. PATENT DOCUMENTS 4,788,758 A     12/1988   Gordon et al.
6,010,247 A *   1/2000    Mouri et al. ................. 384/517
6,527,449 B1    3/2003    Koyama et al.

FOREIGN PATENT DOCUMENTS

JP          2003244239          8/2003

OTHER PUBLICATIONS

European Search Report for European Patent Application No. 03 25 6850; mailed Feb. 18, 2004.

* cited by examiner

*Primary Examiner*—Lenard A. Footland
(74) *Attorney, Agent, or Firm*—Schulte Roth & Zabel, LLP; Joel E. Lutzker; Anna Vishev

(57) ABSTRACT

The bearing device contains two rolling bearings installed on a shaft 9 and a preload is applied to the inner ring of the rolling bearings. The respective dimension for the two rolling bearing inner rings is shortened on both sides in the orientation of the width dimensions of the inner ring, centered on the grooves for the inner ring, with each being set smaller than the dimension of the outer rings. The difference in dimensions is double the difference in the dimensions capable of eliminating rattling of the rolling bearings, when a preload is applied to the outer edge of the inner ring. The outer rings and races are respectively formed to be in a position at half the width dimension of the inner ring from the outer edges of the two outer rings for the two rolling bearings.

3 Claims, 4 Drawing Sheets

BEARING DEVICE

CROSS-REFERENCE TO RELATED APPLICATIONS

This application claims all rights of priority to Japanese Patent Application No. 2002-313639 filed on Oct. 29, 2002, (pending).

BACKGROUND

The present invention relates to a bearing device suitable for use in head stack assemblies where a hard disk drive swing arm is moved in a swinging motion.

The devices shown in FIG. 2 and FIG. 3 are examples of a hard disk drive (HDD). In FIG. 2 and FIG. 3, HDD1 is roughly composed of a rectangular box-like container (base plate) 2, a spindle motor 3 disposed on the base plate, and a head stack assembly (hereinafter "HSA") 6 with magnetic heads 5 which write information in specified locations on a magnetic disk 4, rotated by spindle motor 3, and reads data from any location.

HSA 6 contains a tubular part 8 equipped with a swing arm 7 and magnetic heads 5 at the tip. In addition, HSA includes a shaft 9 containing an inner ring attached to base plate 2. Shaft 9 is composed of a bearing device 10 which supports swing arm 7 so it can swing about shaft 9 and the drive part for driving swing arm 7. Shaft 9, as shown in FIG. 1, typically comprises a rectangular shaft body 9a and a flange 9b, formed at one end of the shaft body 9a. Flange 9b is attached to base plate 2.

FIG. 4 shows a conventional bearing device 010. As shown in FIG. 4, this bearing device 010, roughly comprises two (hereinafter "first" and "second") single row deep groove ball bearings (hereinafter "ball bearings") 012 and 013 installed on shaft 09. A sleeve 014 is disposed outside of the outer rings (hereinafter, "first and second outer rings") 012b and 013b of the first and second ball bearings 012 and 013, with one end of the inner ring 012a of the first ball bearing 012 (hereinafter, "the first inner ring", and the inner ring of the second ball bearing will hereinafter be referred to as "the second inner ring") being in contact with flange 09b.

Sleeve 014 typically comprises tubular sleeve body 014a and a flange 014b, formed on one end of sleeve body 014a. Sleeve 014 corresponds to the outer edge of first outer ring 012b, and it is disposed outside of the first and second ball bearings 012 and 013. In addition, the end surface of flange 014b and the outer edge surface of first outer ring 012b are arranged on a single surface. The end surface of sleeve body 014a and the outer edge surface of second outer ring 013b are also arranged on a single surface.

The width dimensions of the first and second outer rings 012b and 013b are set to the same dimension A, and the width dimensions of the first and second inner rings 012a and 013a are also set to the same dimension B, such that A>B. In this case, the reduced setting for the width dimension B of the first and second inner rings 012a and 013a is done so that it only shortens the equal distance (A−B/2) from each of the ends of the first and second outer rings 012b and 013b.

This distance (A−B/2) is greater than the amount δ of a one-sided rattle of each axial orientation (the axial orientation of the first ball bearing 012, the axial orientation of the second ball bearing 013), and it is a dimensional difference capable of preventing the production of an axial one-sided rattle of each ball bearing which imparts a preload to one end of each double-end part of the first and second inner rings 012a and 013a (the double-end part of the first inner ring 012a, the double-end part of the second inner ring 013a). For example, in FIG. 4, it is a dimensional difference capable of preventing the production of an axial one-sided rattle of the second ball bearing 013, which imparts a preload in direction C to the outer end of the second inner ring 013a.

Generally, the "axial rattle" of the ball bearing is the sum of the previously-set dimensions of the axial clearance of the ball bearing, and the axial relative dimensions of the outer ring and inner ring, determined by the elastic deformation of the ball bearing produced by the application of a set preload. Because the natural state is for the rolling element to be supported by both rolling grooves, whose point contact is the center of the rolling groove of the outer ring and the center of the rolling groove of the inner ring, a one-sided rattle is formed by pushing one end of either the inner ring or the outer ring, and an opposite-side rattle is formed by pushing the other end. The total amount of the "axial rattle" of the ball bearing is the sum of the amounts of both these rattles.

The first and second inner ring rolling grooves 012d and 013d of the first and second inner rings 012a and 013a are formed at the center of the width of the first and second inner rings 012a and 013a. Therefore, centered on the centers of the first and second inner ring rolling grooves 012d and 013d, the width dimensions of both the first and second inner rings 012a and 013a are both B/2 and equal.

The first and second ball bearings 012 and 013 are installed on the shaft 09 so that they touch the first and second outer rings 012b and 013b, and between the first and second inner rings 012a and 013a, in the state prior to applying a preload to the second inner ring 013a, a space S with a maximum (A−B) length is formed. In addition, the distance P between the first and second rolling elements 012c and 013c of the first and second ball bearings 012 and 013 is equal to A.

In this bearing device 010, with first and second outer rings 012b and 013b attached, they are fixed to the inner face of the sleeve body 014a with an adhesive. First inner ring 012a is installed on shaft 09 and fixed with an adhesive. Second inner ring 013a is slidably installed on shaft 09. The outer end of second inner ring 013a applies a preload in the direction of the arrows C in FIG. 4, and while such a preload is applied, the second inner ring 013a is fixed to the shaft 09 with an adhesive. This structure eliminates the axial rattle so that the desired precision and rigidity of the bearing device 010 are maintained.

The size (A−B) of space S is set so that it is greater than 2δ of the rattles of the bearing device 010 (the sum of the amount δ of the axial one-sided rattle of the first ball bearing 012 and of the amount δ of the axial one-sided rattle of the second ball bearing 013), and when a preload is applied to the second inner ring 013a, the amount of preload can be adjusted over a wide range.

In conventional bearing devices when the width dimension of the first and second outer rings and the width dimensions of the first and second inner rings are identical, elimination of the rattling of the bearing device when a preload is applied, relied on methods such as shaping space S between the first and second inner rings so that an annular projection separates the first and second outer rings in the inner surface of the sleeve or creating an annular space, formed by a separate member, between the first and second outer rings. But in bearing device 010, there is no need to use such an annular projection of the sleeve inner surface or an annular space created by a separate member, and to this extent, the width dimensions of the overall body of the bearing device 010 can be reduced. Therefore, the thickness of swing arm 7 support can be reduced and the HDD 1 can be made thinner.

Moreover, in bearing device 010, in the state prior to the application of a preload to the second inner ring 013a, the centers of the first and second outer ring grooves 012e and 013e of the first and second outer rings 012b and 013b, the centers of the first and second inner ring grooves 012d and 013d of the first and second inner rings 012a and 013a, and the centers of the first and second rolling elements 012c and 013c are on a single plane. Because the first and second ball bearings 012 and 013 have a symmetrical structure with respect to this plane, when the first and second ball bearings 012 and 013 are installed on the shaft 09 and the bearing device 010 is assembled, there is no need to control the arrangement of the first and second ball bearings 012 and 013. Therefore, the production efficiency can be increased.

Bearing device 010 is very useful for PC card type ultra-thin hard disk drive devices, for which recently there has been a particularly strong demand.

In another conventional embodiment, bearing device 010 can also be constructed without sleeve 014 as seen in FIG. 5. In bearing device 010 of FIG. 5, the first and second outer rings 012b and 013b are in contact with each other. First inner ring 012a is installed on shaft 09 and fixed with an adhesive, while second inner ring 013a is slidably installed on the shaft 09. A preload is then applied to the outer end of the second inner ring 013a in the direction of the arrows C in FIG. 5. While such a preload is applied, second inner ring 013a is fixed to shaft 09 with an adhesive, thus eliminating the axial rattle so that the desired precision and rigidity of bearing device 10 are maintained.

Bearing device 010 is constructed similar to the bearing device shown in FIG. 4. Space S is maintained between the first and second inner rings 012a and 013a. The annular protrusion of the sleeve inner surface and the annular space formed by a separate member, which have so far been necessary, become redundant, and to such an extent, the width orientation dimensions of the body of the bearing device 010 can be reduced. Consequentially, the thickness of swing arm 7 support can be reduced and the HDD 1 can be made thinner. Moreover, when the first and second ball bearings 012 and 013 are installed on the shaft 09 and the bearing device 010 is assembled, there is no need for control of the arrangement of the first and second ball bearings 012 and 013, and the production efficiency can thus be increased.

BRIEF SUMMARY

An object of the present invention is to propose a bearing device free of the problems associated with conventional bearing devices, with improved swinging precision, rigidity and natural frequency without compromising the production efficiency.

According to the present invention, a bearing device comprising two rolling bearing is installed on a shaft and a preload is applied to the inner ring of the rolling bearings. The width of the two inner rings for the rolling bearings is narrowed on both sides and centered on the grooves for the inner ring. The inner ring widths being set smaller than the width dimensions of the outer ring. Therefore, the difference in dimensions is double the difference in dimensions capable of eliminating rattling of the rolling bearings when a preload is applied to the outer edge of the inner ring, and the grooves of the outer ring are each formed so as to be in a position at half the width of the inner ring from the outer edges of the two outer rings for the two rolling bearings.

A space is created by a difference between the total width dimensions of the two outer rings and the total width dimensions of the two inner rings. This difference is greater than double the total amount $2\delta$ of the axial one-sided amount of rattling $\delta$ of the two rolling bearings. Therefore, if a preload is applied to the outer edge of either internal ring, the amount of preload can be adjusted over a wide range. This eliminates the rattling of the bearing device and the desired precision and rigidity of the bearing device can be maintained.

Moreover, the grooves of the outer ring are each formed to be in a position at half the width of the inner ring from the outer edges of the two outer rings, and while the width dimension of the conventional bearing device overall body are maintained, the space between the two rolling elements of the two rolling bearings is maximized and twisting is minimized. This improves stability swinging precision, rigidity and natural frequency and a superior bearing device can be obtained.

In addition, because the width of the bearing device can exceed the total width of said two outer rings, when this bearing device is used in a hard disk drive, for example, the thickness dimensions of the swing arm support can be reduced and the HDD can be made thinner. When used for PC card type ultra-thin hard disk drive devices, for which recently there has been a particularly strong demand, such a bearing device provides a superior effect.

Furthermore, it is easy to identify the sides of the outer ring edges and inner ring edges that are aligned and that are not aligned with the rolling bearings that make up the bearing device, so that when the two rolling bearings are arranged and installed on the shaft and the bearing device assembled, it is easy to select the orientation of the arrangement and the orientation for assembling each of the rolling bearings, so there is no loss of production efficiency.

The above aspects, advantages and features are of representative embodiments only. It should be understood that they are not to be considered limitations on the invention as defined by the claims. Additional features and advantages of the invention will become apparent in the following description, from the drawings, and from the claims

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
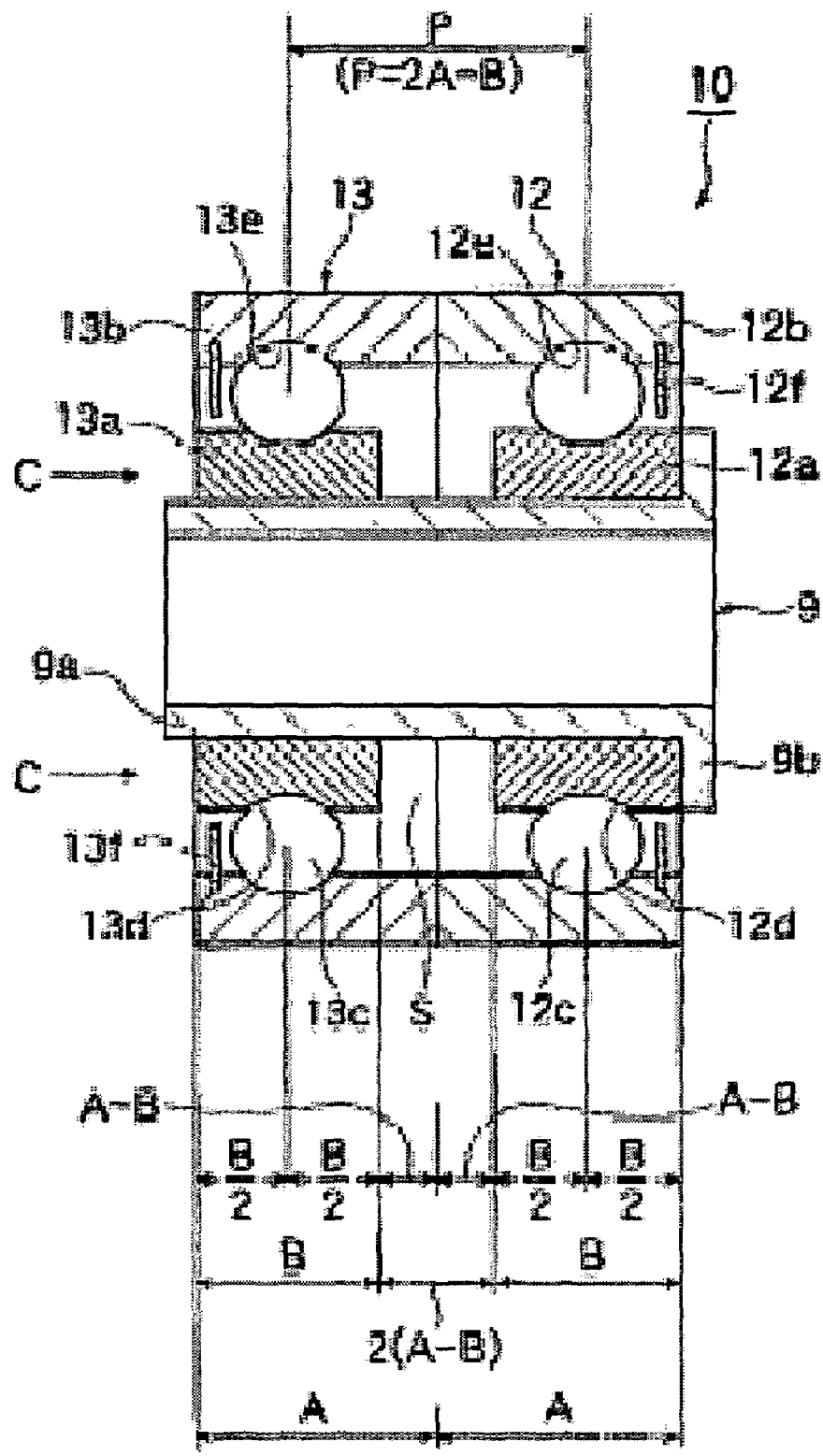
FIG. 1 shows a vertical cross sectional diagram of a bearing device according to an embodiment of the present invention.
Figure 2:
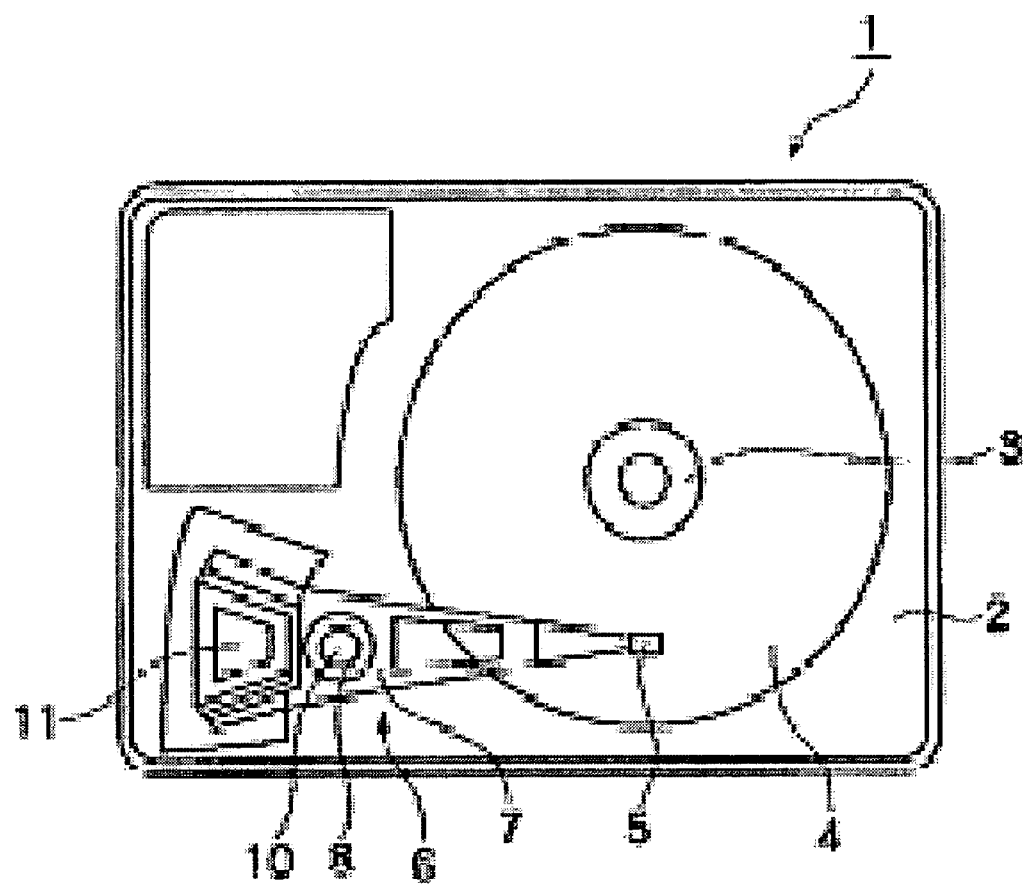
FIG. 2 shows a plan view of an outline of the overall structure of a hard disk drive (HDD) using the same bearing device shown in FIG. 1.
Figure 3:
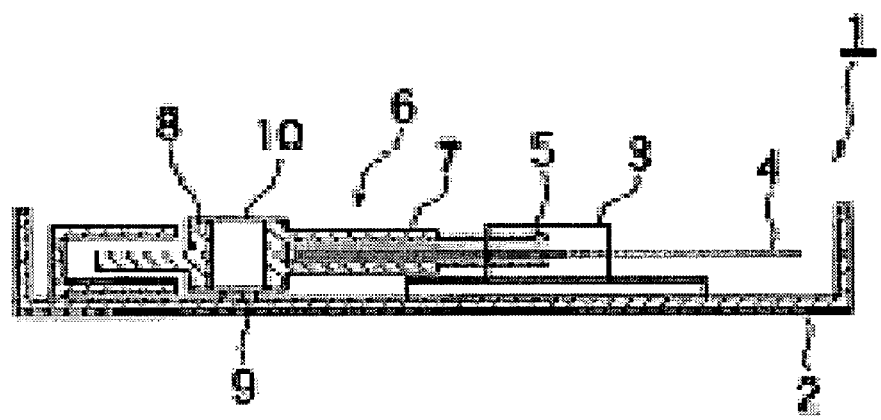
FIG. 3 shows a cross sectional diagram of the hard disk drive (HDD) in FIG. 2.

FIG. 1 shows a vertical cross sectional diagram of a bearing device according to the present invention. As is shown in FIG. 1, the bearing device 10 comprises a shaft 9. A first and second single row of deep groove ball bearings 12 and 13 are disposed in the tubular main body of the aforementioned shaft 9. The first and second shields 12f and 13f cover the outside edges of these first and second ball bearings 12 and 13. One edge of the first inner ring 12a for the first ball bearing 12 is in contact with the flange 9b of shaft 9. The first and second shields 12f and 13f prevent leakage of the grease filling the inside of bearing device 10. A sleeve disposed outside of the first and second ball bearings 12 and 13 and the first and second outer rings 12b and 13b is not used in this embodiment.

The width dimensions for the first and second inner rings 12a and 13a are set at the equal measurement of B, and the width dimensions for first and second outer rings 12b and 13b are set to the same measurement A, but they are set such that A>B. In this case, the reduction in the setting for the width measurement B for the first and second inner rings 12a and 13a is made by reducing the width on both sides of the first and second inner rings 12a and 13a centered on the first and second inner ring races 12d and 13d for the first and second inner rings 12a and 13a. Therefore, the width measurements on both sides of the first and second inner rings 12a and 13a are of the same length B/2 each centered on the first and second inner ring races 12d and 13d. The first and second inner ring races 12d and 13d are formed at the center of the width of the first and second inner rings 12a and 13a, respectively.

Furthermore, the dimensions A for the widths of the first and second outer rings 12b and 13b are set using the aforementioned B and E, which will be discussed in the following, such that A≦(B+2E). More specifically, it is set to A=(B+2E) in this embodiment.

E is the difference in dimensions that allows absorption of the rattle on one side in the axial orientations (axial orientation for the first ball bearing 12 and the axial orientation for the second ball bearing 13) of the first and second ball bearings 12 and 13 when a preload is applied to one of the edges of the first inner ring 12a and one of the edges of the second inner ring 13a. FIG. 1 shows the outer edges for each of the inner rings for each the first and second inner rings 12a and 13a corresponds to this so-called "one of the edges", and letting this amount of rattle of δ, E>δ.

Figure 4:
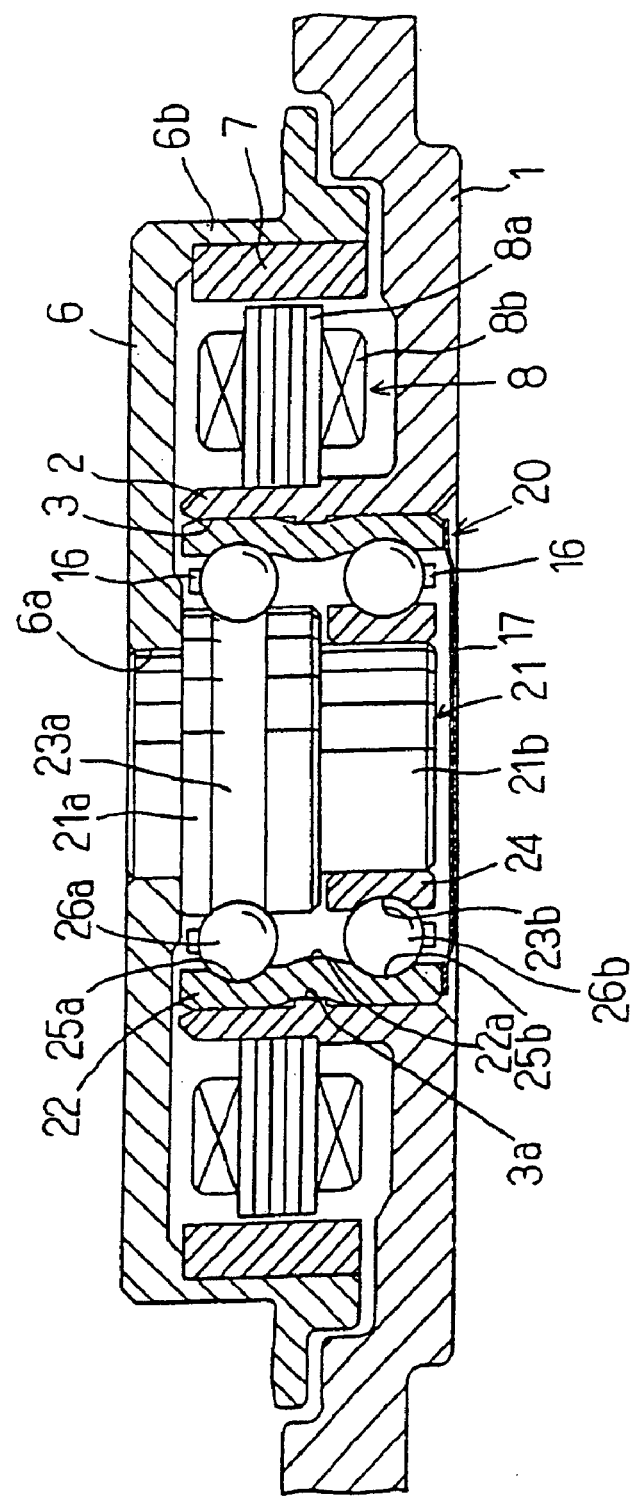
FIG. 4 shows a cross sectional diagram of one embodiment of a conventional bearing device.
Figure 5:
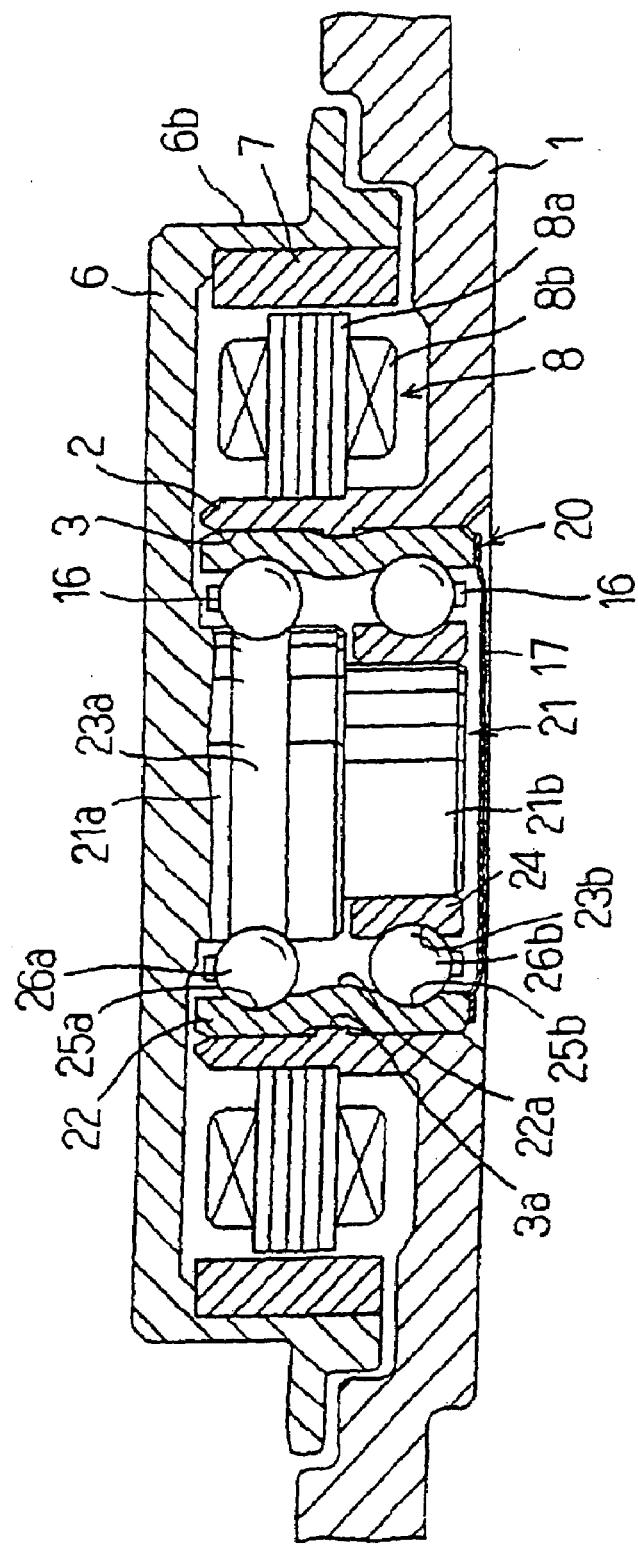
FIG. 5 shows a cross sectional diagram of another embodiment of a conventional bearing device.

Thus, the measurement A for each width for the first and second outside rings 12b and 13b is set to A≦(B+2E), preferably in this embodiment being set to A=(B+2E). This allows for dimension A for the width of the first and second outer rings 12b and 13b to be smaller to reduce the size of the bearing device 10. Compared to conventional bearing devices (see FIG. 4), the measurements for the width of the first and second inner rings 12a and 13a are each shortened (A−B)/2=E from each edge (both edges of the first outer ring 12b and both edges of the second outer ring 13b) of the first and second outer rings 12b and 13b, and the bearing device 10 can be designed and produced such that first and second inner rings 12a and 13a are positioned for the first and second outer rings 12b and 13b, because the convenience of this was considered.

Furthermore, each of the outer edges of the first and second inner rings 12a and 13a are aligned with each of the outer edges of the first and second outside rings 12b and 13b respectively, and centered at a position of half (B/2). That is, the first and second outer races 12e, 13e are respectively formed such that the center points of first and second outer rings 12b, 13b are set at the position B/2, one half of each dimension B for the distance from the outer edges of the first and second outer rings 12b, 13b to the first and second inner rings 12a, 13a.

Therefore, viewed from the reduced setting for the width dimension B for the first and second inner rings 12a and 13a and the relative positional relationship with the first and second outer rings 12b and 13b, the shortening is only the length (A−B) from the each of the outer edges of the first and second outer rings 12b and 13b. This length (A−B) is the amount of the rattle of the first and second inner rings 12a and 12b in the axial orientation on one side. It is greater than twice the total amount δ of the rattle on one side in the axial orientation of the first and second ball bearings 12 and 13, and it is a difference in dimensions that makes it sufficiently possible to absorb this rattle 2δ with the application of the preload to each of the outer edges of the first and second inner rings 12a and 13a, having a relationship of 2δ<A−B=2E.

With the bearing device 10 assembled in this manner, the first and second ball bearings 12 and 13 are installed on shaft 9 so that first and second outer rings 12b and 13b are tight, and a space S with a length of 2(A−B) is formed between the first and second inner rings 12a and 13a. Here, 2(A−B) =4E>4δ.

Therefore, the following is performed to assemble and finish the bearing device 10 without rattle.

The first and second outer rings 12b and 13b are maintained in a state of contact, and the first inner ring 12a is installed on the shaft 9 and affixed with an adhesive with the second inner ring 13a installed on the shaft 9 so it can slide. A preload is applied to the outer edge of the second inner ring 13a in the direction of the arrow C in FIG. 1, and with this preload applied, the second inner ring 13a is affixed to the shaft using an adhesive, so the rattle in the axial orientation from one side of the second ball bearing 13 and the rattle in the axial orientation from one side of the first ball bearing 12 are brought together and the rattle in the axial orientation of the bearing device as a whole is removed to maintain the prescribed precision and rigidity of the bearing device 10. However, the application of a preload to the inside edge of the second inner ring 13a cannot normally be done.

Since the size of space S, 2 (A−B), as previously mentioned, is set to be larger than twice 2δ (the amount of rattle for the bearing device 10 as a whole in the axial orientation), the sum of the rattle amount δ on each side in the axial orientation of the first and second ball bearings 12 and 13, it is possible to adjust the preload in a wide range when applying a preload to the second inner ring 13a.

The bearing device 10 is finally completed by eliminating the rattle in the axial orientation in this manner and attaching the first and second shields 12f and 13f to the bearing device 10 for which the prescribed precision and rigidity has been maintained.

The distance P between the first and second rolling elements 12c and 13c of the first and second ball bearings 12 and 13 in the bearing device completed in this manner is (2A−B)>A and is maximized in the case where the dimensional difference E(E>δ) eliminates the rattle δ on one side in the axial orientation of the first and second ball bearings 12 and 13 when a preload is applied to the outer edges of each of the first and second inner rings 12a and 13a. Both dimensions B/2 for the sides in the orientation of the width for the first and second inner rings 12a and 13a centered on each of the centers of the first and second inner ring races 12d and 13d and the dimension B for the respective widths of the first and second inner rings 12a and 13a, when the width dimensions A of the first and second outer ring 12b and 13b satisfy the condition A≦(B+2E).

Therefore, breakdowns are reduced, stability increased, and shaking precision, rigidity, characteristic frequency, etc., are improved by maximizing the (2A−B) distance P between the first and second rolling elements 12c and 13c, and a high quality bearing device can be obtained.

In the foregoing embodiment, an example where a single bearing was the ball bearing was given, but it may be a roller bearing, and it may also be a rolling bearing that includes both a ball bearing and a roller bearing.

Since the bearing device according to this embodiment has the aforementioned constitution, it can exhibit the following effects.

A space S of the difference 2(A−B) between the total width dimension of the first and second outer rings 12b and 13b, 2A and the total width dimension 2B of the first and second inner rings 12a and 13a can be assured between the first and second inner rings 12a and 13a, and furthermore, since this difference is greater than 2δ of rattle amounts δ in each of the axial orientations for the two rolling bearings 12 and 13, the amount of preload can be adjusted over a wide range when a preload is applied to one orientation of either inner ring, and the rattle of the bearing device 10 can be eliminated, so that the prescribed precision and rigidity for the bearing device can be maintained.

Furthermore, each of the first and second outer ring races 12e and 13e are formed in a position half the length of the inner ring width dimension B (B/2) from the outer edge of the first and second outer rings 12b and 13b, maintaining the overall width dimension (axial orientation) 2A of the conventional bearing device (see FIG. 4), the distance P between the first and second rolling elements 12c and 13c of the first and second rolling bearings 12 and 13 is maximized, so breakdowns are reduced, stability is increased, and shaking precision, rigidity, and characteristic frequency, etc., are improved, and a high quality bearing device can be obtained.

Furthermore, since the width (length in the axial direction) of the bearing device can be held to approximately the total width 2A of the first and second outer rings 12b and 13b, when this bearing device 10 is used in a hard disk drive (HDD) 1, the dimension of the thickness of the swing arm 7 support, for example, can be made smaller, and the HDD 1 can be made thinner. It has superior effects as a bearing device for use in PC card type ultra thin hard disk drive devices for which the demand has become stronger recently.

Furthermore, it is easy to determine the sides of the outer ring edge and inner ring edges that are aligned and not aligned with the first and second rolling bearings 12 and 13 that make up the bearing device 10, so when the two rolling bearings (first and second rolling bearings) 12 and 13 are installed on the shaft 9 and the bearing device assembled, it is easy to select the orientation of the arrangement and the orientation for assembling each of the rolling bearings, so there is no loss of production efficiency.

Furthermore, since the main body 9a of the shaft 9 is tubular, it can be screwed into and affixed to the base plate 2 with a bolt through the tubular main body 9 of the shaft 9 when the bearing device is used with a fixed inner ring. An ultra thin bearing device 10 is fixed to the base plate 2 of the HDD 1, therefore, the attachment of the bearing device becomes simple. The smaller the bearing device 10 is made the greater the effect.

The present invention is not limited to the above embodiment, and various changes are possible within the scope of the invention. For example, a sleeve may be disposed outside of the first and second outer rings 12b and 13b.

Furthermore, if the width dimensions of each of the first and second inner rings 12a and 13a are reduced to the smallest width where the inner rings will function, first and second ball bearings 12 and 13 that are not high precision produced, and further an increase in the rattle of each of the ball bearings in the axial orientation is permitted and working with this, the bearing device can be modified to make a dimensional difference E that can absorb the rattle δ for one side larger. With bearing devices 10 modified in this manner, it is possible to make the distance P (P=(2A−B)) between the first and second rolling elements 12c and 13c relatively large, and produce an even more stable bearing device at low cost.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A bearing device having a shaft, comprising:
    two rolling bearings mounted on said shaft, each of said rolling bearings further comprising an outer ring, having an outer ring groove, and an inner ring,
    wherein said outer ring groove is centered at a position equal to half of a width of said inner ring from an outer edge of said outer ring, wherein the width of said inner ring is smaller than a width of said outer ring, and wherein the difference between the width of the outer ring and the width of the inner ring is double a difference in width thereby eliminating rattling of said rolling bearings when preload is applied.

2. The bearing device according to claim 1, wherein said inner ring further comprises an inner ring groove.

3. The bearing device according to claim 2 further comprising a plurality of rolling elements disposed between said outer ring groove and said inner ring grove of each said rolling bearing.

* * * * *